United States Patent
Barabash et al.

(10) Patent No.: US 9,667,653 B2
(45) Date of Patent: May 30, 2017

(54) CONTEXT-AWARE NETWORK SERVICE POLICY MANAGEMENT

(71) Applicant: International Business Machines Corporation, Armonk, NY (US)

(72) Inventors: Katherine Barabash, Haifa (IL); Rami Cohen, Haifa (IL); Anna Levin, Haifa (IL); Eran Raichstein, Yokneam Ilit (IL)

(73) Assignee: International Business Machines Corporation, Armonk, NY (US)

(*) Notice: Subject to any disclaimer, the term of this patent is extended or adjusted under 35 U.S.C. 154(b) by 59 days.

(21) Appl. No.: 14/569,810

(22) Filed: Dec. 15, 2014

(65) Prior Publication Data

US 2016/0173535 A1   Jun. 16, 2016

(51) Int. Cl.
*H04L 29/06* (2006.01)
*H04L 12/24* (2006.01)

(52) U.S. Cl.
CPC .......... *H04L 63/20* (2013.01); *H04L 41/0816* (2013.01); *H04L 41/0893* (2013.01)

(58) Field of Classification Search
USPC .......................................................... 726/1
See application file for complete search history.

(56) References Cited

U.S. PATENT DOCUMENTS

| | | | |
|---|---|---|---|
| 6,167,513 A | 12/2000 | Inoue et al. | |
| 7,474,741 B2 * | 1/2009 | Brunson | H04L 12/58 379/88.12 |
| 8,612,612 B1 | 12/2013 | Dukes et al. | |
| 8,719,898 B1 * | 5/2014 | Barton | G06F 9/45533 380/270 |
| 8,726,343 B1 * | 5/2014 | Borzycki | G06F 21/6218 709/203 |
| 8,806,570 B2 * | 8/2014 | Barton | H04L 63/20 726/1 |

(Continued)

FOREIGN PATENT DOCUMENTS

| | | |
|---|---|---|
| WO | 2013123445 | 8/2013 |
| WO | 2013184225 | 12/2013 |

OTHER PUBLICATIONS

Ceruti, Marion G.; Duffy, LorRaine; Arias-Thode, Y. Meriah. Analysis of Policy and Standards for Joing C4ISR Network Technologies. Eigth IEEE International Workshop on Policies for Distributed Systems and Networks, 2007. http://ieeexplore.ieee.org/stamp/stamp.jsp?arnumber=4262599.*

(Continued)

*Primary Examiner* — Jeremiah Avery
(74) *Attorney, Agent, or Firm* — Daniel Kligler (57) ABSTRACT

A method includes converting, by a computer, a set of context-aware data forwarding policies to a set of network configuration forwarding rules for one or more data forwarding devices in a network having a dynamic context, and conveying, to the data forwarding devices, the set of network configuration forwarding rules. Upon detecting a change in the dynamic context of the network, the set of network configuration forwarding rules ae updated based on the set of context-aware data forwarding policies and the change in the dynamic context, and the updated set of network configuration forwarding rules are conveyed to the data forwarding devices.

23 Claims, 4 Drawing Sheets

(56) References Cited

U.S. PATENT DOCUMENTS

| | | | | |
|---|---|---|---|---|
| 8,813,179 | B1* | 8/2014 | Qureshi | H04L 63/20 |
| | | | | 726/1 |
| 8,887,230 | B2* | 11/2014 | Barton | H04L 41/046 |
| | | | | 726/1 |
| 8,914,845 | B2* | 12/2014 | Barton | H04L 63/0807 |
| | | | | 726/1 |
| 9,331,892 | B2* | 5/2016 | Lindberg | H04L 41/00 |
| 2007/0143851 | A1* | 6/2007 | Nicodemus | G06F 21/55 |
| | | | | 726/25 |
| 2012/0131155 | A1 | 5/2012 | Madey et al. | |
| 2013/0298244 | A1 | 11/2013 | Kumar et al. | |
| 2013/0343295 | A1 | 12/2013 | Deo | |

OTHER PUBLICATIONS

Patel, Pankesh; Jardosh, Sunil; Chaudhary, Sanjay; Ranjan, Prabhat. Context Aware Middleware Architecture for Wireless Sensor Network. IEEE International Conference on Services Computing, 2009. http://ieeexplore.ieee.org/stamp/stamp.jsp?arnumber=5283906.*

Perez, G.M., "Dynamic Policy-Based Network Management for a Secure Coalition Environment", Network-Centric Military Communications, IEEE Communications Magazine,vol. 44 ,Issue: 11, Nov. 20, 2006, pp. 58-64.

* cited by examiner

CONTEXT-AWARE NETWORK SERVICE POLICY MANAGEMENT

FIELD OF THE INVENTION

The present invention relates generally to computer network management, and specifically to defining and enforcing context-aware network service policies.

BACKGROUND

Computer network services such as firewalls, virtual private networks (VPNs) and acceleration services are used to implement connectivity policies between network endpoints (or clients). While these network services may be necessary (e.g., to accommodate security considerations or to overcome system bottlenecks), they may consume additional system resources. For example, connecting a pair of endpoints over a public network may require a secure VPN tunnel that is associated with encryption and authentication and therefore consumes system resources. Another example of a resource consuming network function is data compression that can be used to overcome low speed data links.

The description above is presented as a general overview of related art in this field and should not be construed as an admission that any of the information it contains constitutes prior art against the present patent application.

SUMMARY

There is provided, in accordance with an embodiment of the present invention a method, including converting, by a computer, a set of context-aware data forwarding policies to a set of network configuration forwarding rules for one or more data forwarding devices in a network having a dynamic context, conveying, to the data forwarding devices, the set of network configuration forwarding rules, detecting a change in the dynamic context of the network, updating, based on the set of context-aware data forwarding policies and the change in the dynamic context, the set of network configuration forwarding rules, and conveying, to the data forwarding devices, the updated set of network configuration forwarding rules.

There is also provided, in accordance with an embodiment of the present invention an apparatus, including a network adapter coupled to a network having a dynamic context and including one or more data forwarding devices, a memory configured to store a set of context-aware data forwarding policies, and a processor configured to convert, the set of context-aware data forwarding policies to a set of network configuration forwarding rules for the one or more data forwarding devices, to convey, to the data forwarding devices, the set of network configuration forwarding rules, to detect a change in the dynamic context of the network, to update, based on the set of context-aware data forwarding policies and the change in the dynamic context, the set of network configuration forwarding rules, and to convey, to the data forwarding devices, the updated set of network configuration forwarding rules.

There is further provided, in accordance with an embodiment of the present invention a computer program product, the computer program product including a non-transitory computer readable storage medium having computer readable program code embodied therewith, the computer readable program code including computer readable program code configured to convert a set of context-aware data forwarding policies to a set of network configuration forwarding rules for one or more data forwarding devices in a network having a dynamic context, computer readable program code configured to convey, to the data forwarding devices, the set of network configuration forwarding rules, computer readable program code configured to detect a change in the dynamic context of the network, computer readable program code configured to update, based on the set of context-aware data forwarding policies and the change in the dynamic context, the set of network configuration forwarding rules, and computer readable program code configured to convey, to the data forwarding devices, the updated set of network configuration forwarding rules.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

In traditional, relatively static network deployments, network services typically take into account static context variables such as endpoint locations and average network load. For example, if two endpoints are located on the same private local network, the connectivity service between them may not require a secure virtual private network (VPN), thereby saving system resources.

However, in modern virtualized network deployments, the network's context can be dynamic. For example, network endpoint locations may change, traffic load can increase/decrease, available computational resources may change, and communicating groups may add or remove physical and/or virtual machines. Therefore in networks having a "dynamic context", implementing a static deployment of network services may result in inefficient resource utilization.

Embodiments of the present invention provide methods and systems for defining and enforcing context-aware network service policies, so that the enforced policies and the services applied between communicating endpoints can depend on a dynamic context that exists at the time of enforcement. Examples of the dynamic context include current network attributes such as current network endpoint locations (typically at a given data center), a given location's security context (i.e., for a public cloud), a size of elastic application (e.g., a number of endpoints in a given group), network conditions such as available bandwidth, and time of day. Additionally or alternatively, the dynamic context may include data attributes such as untrusted data (i.e., tagging data on the network as untrusted), a source of the data packet (e.g., local NAS server 42), and a destination for the data packet (e.g., remote NAS server 60).

As described hereinbelow, a computer (e.g., a software defined network controller) coupled to a network having a dynamic context converts a set of context-aware data forwarding policies to an initial set of network configuration forwarding rules, and conveys the initial set of network configuration forwarding rules to data forwarding devices in the network. Examples of data forwarding devices include switches, routers and network service appliances such as firewalls. At a subsequent time, if the computer detects a change in the dynamic context of the network, then the computer can update the set of network configuration forwarding rules, and convey the updated set of network configuration forwarding rules to the data forwarding devices.

To update the set of network configuration forwarding rules, the computer may apply the current (i.e., changed) context of the network to the set of context-aware data forwarding policies. Systems implementing embodiments of the present invention can adjust a current set of data forwarding rules to reflect a current context of the network, thereby optimizing performance and enhancing security.

System Description

Figure 1:
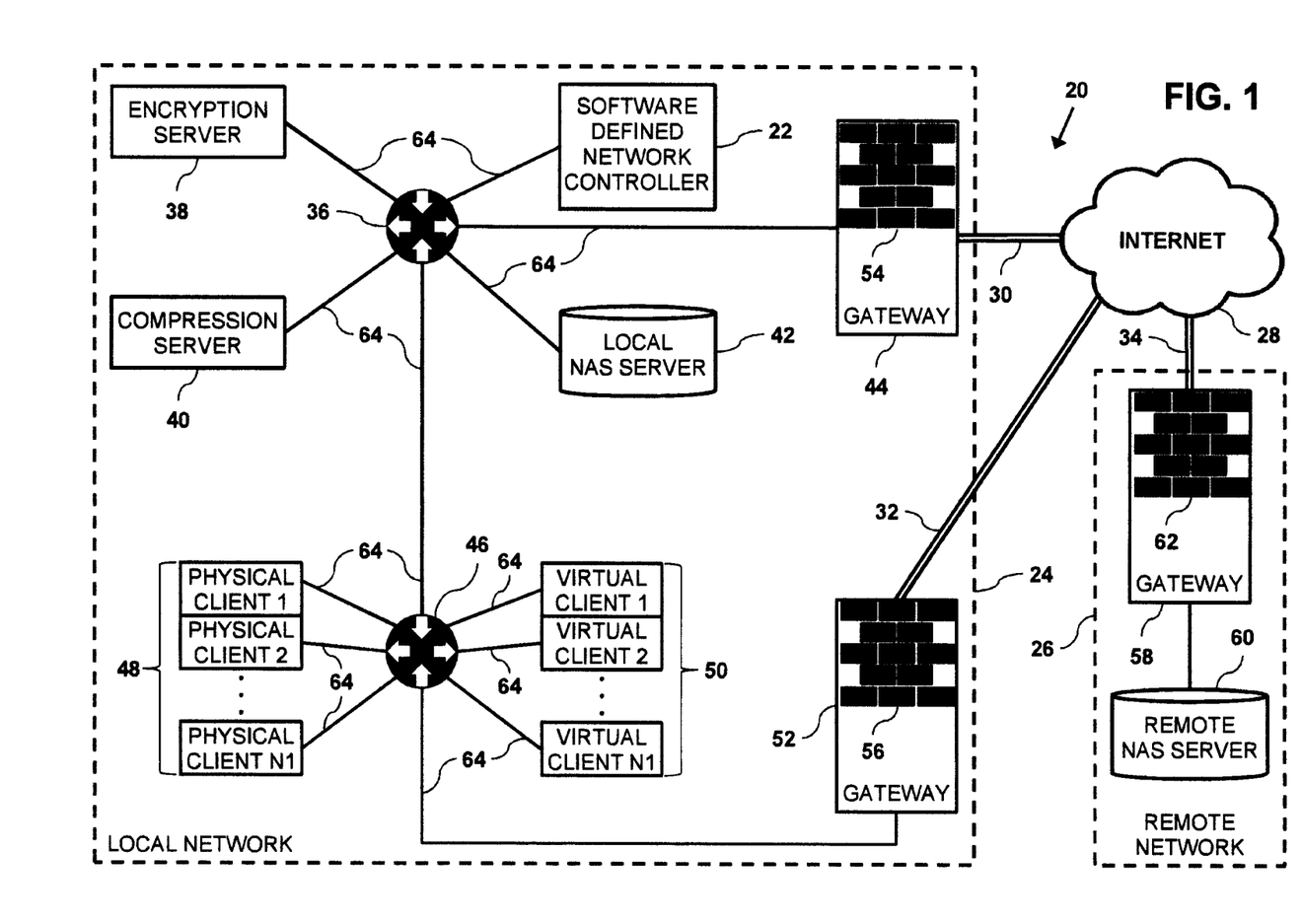
FIG. 1 is a block diagram of a network comprising a software defined network controller configured to enforce context-aware network service policies, in accordance with an embodiment of the present invention.

FIG. 1 is a block diagram of a network 20 (e.g., a wide area network) comprising a software defined network controller (SDNC) 22 configured to enforce context-aware network service policies, in accordance with an embodiment of the present invention. Network 20 comprises a local network 24 and a remote network 26 that communicate over Internet 28 via VPN tunnels 30, 32 and 34. In the example shown in FIG. 1, network 24 can be located at a local data center, and network 26 can be located at a remote data center. In embodiments of the present invention, local network 24 has a dynamic context, as explained hereinbelow.

Local network 24 comprises a first local network switch 36 that is coupled to SDNC 22, an encryption server 38, a compression server 40, a local Network Attached Storage (NAS) server 42, a first local security gateway 44, and a second local network switch 46. In addition to switch 36, switch 46 is coupled to physical clients 48, virtual clients 50 and a second local security gateway 52. SDNC 22 is described in detail in the description referencing FIG. 2 hereinbelow.

Security gateway 44 comprises a first local firewall 54, and security gateway 52 comprises a second local firewall 56. Firewalls 54 and 56 control incoming and outgoing network traffic (to/from VPN tunnels 30 and 32, respectively) for the local network based on rules set by SDNC 22 using embodiments described herein.

Figure 2:
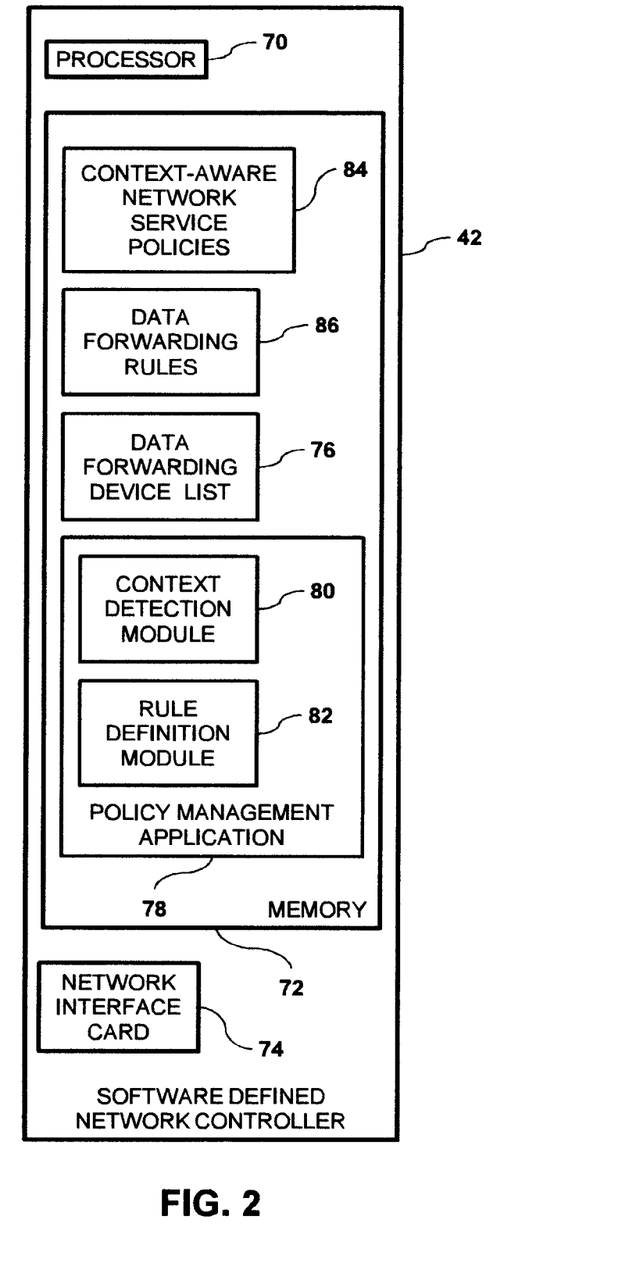
FIG. 2 is a block diagram of the software defined network controller, in accordance an embodiment of the present invention.

Physical clients 48 comprise computers that are coupled to network switch 46, and virtual clients 50 comprise virtual machines executing on computers that are coupled to the second network switch. While the configuration in FIG. 2 shows appliances (i.e., encryption server 38, compression server 40 and NAS server 42) coupled to switch 36 and the physical and the logical clients coupled to the switch 46, other configurations are considered to be within the spirit and scope of the present invention. For example, all the appliances and the logical and the physical clients can be connected to a single network switch (e.g., switch 36).

Based on rules managed by SDNC 22, network switches 36 and 46 may forward data to encryption server 38 and/or compression server 40 for encryption and compression, respectively. For example, prior to transferring a file from NAS server 42 to remote network 26, a given local network switch can forward the file to encryption server 38 to encrypt the file, and then forward the encrypted file to compression server 40 to compress the encrypted file.

In the example shown in FIG. 1, remote network 26 comprises a remote security gateway 58 and a remote NAS server 60. Security gateway 58 comprises a remote firewall 62 that controls incoming and outgoing network traffic (to/from VPN tunnel 34) for the remote network. Additionally, switches 36 and 46 are coupled to each other and to SDNC 22, encryption server 38, compression server 40, local NAS server 42, physical clients 48, virtual clients 50, and gateways 44 and 52 via network segments 64.

FIG. 2 is a block diagram showing hardware and software components of SDNC 22, in accordance an embodiment of the present invention. SDNC comprises a processor 70, a memory 72 and a network interface card (NIC) 74 that couples the SDNC to network 24 via switch 36.

Processor 70 is configured to identify data forwarding devices in local network 24, and to store the identified devices to a data forwarding device list 76. In the example shown in FIG. 1, the data forwarding devices in local network 24 comprise network switches 36 and 46, encryption server 38, compression server 40, security gateways 44 and 52, and firewalls 54 and 56.

Processor 70 is also configured to execute from memory 72, a policy management application 78 that comprises a context detection module 80 and a rule definition module 82. Rule definition module 82 is configured to retrieve context-aware network service policies 84, and convert the retrieved policies into data forwarding rules 86 based on a current context of local network 24.

Context definition module 80 is configured to detect a change in the dynamic context of network 20 in local network 24. Examples of dynamic context changes include, but are not limited to, detecting untrusted data in local network 24, detecting a high utilization of firewall 54 and/or firewall 56, detecting a connection/disconnection of a given physical client 48 to network 20, and detecting a connection/disconnection of a given virtual client 50 to local network 24.

In embodiments of the present invention as described hereinbelow, upon context detection module 80 detecting a change in the dynamic context of network 20 in local network 24, rule definition module 82 can update rules 86 to reflect the change in the dynamic context, and convey the updated data forwarding rules to the appropriate data forward devices in list 76. For example, if module 80 detects that firewall 54 is overloaded (i.e., highly utilized), then module 82 can update rules 86 and convey the updated rules to data switches 36 and 46, the updated comprising commands that configure the local data switches to forward all outbound data traffic (i.e., for the local network) to firewall 56.

In embodiments of the present invention, processor 70 is configured to detect the dynamic context of network 20, and can calculate and apply rules 86 for policy enforcement according to policies 84, while taking into account the dynamic context. Policies 84 can be defined by a network administrator (not shown) or by the local datacenter's orchestration tools (also not shown). In operation, (currently defined) policies 84 are non-conditional and only allow assigning static actions to flows.

In order to allow conditional policy definition, the following extension to a policy definition language (i.e., a language used to define policies 84) can be introduced:

IF context THEN action1 ELSE action2 (i.e., IF source and destination on the same site THEN forward directly ELSE use compression).

In the configuration shown in FIG. 1, when a given local switch requests a given policy 84 to be applied to a flow, SDNC 22 retrieves the relevant conditional policy 84 and translates the conditional policy (i.e., a conditional policy definition) into a corresponding forwarding rule 86, taking into account the dynamic context as required by the given policy. In embodiments of the present invention, when processor 70 receives the flow's data packet, the processor can perform a lookup in policy table 84 and derives one or more forwarding rules 86 regardless of the context.

To convey rules 86 to the local network switches and to configure their respective forwarding tables (i.e., forwarding tables in the local network switches), processor 70 first looks up a given policy 84, then determines the relevant dynamic context (e.g. whether a source and a destination in a given flow are currently located on the same network). Upon processing this information, processor 70 can configure the data forwarding devices accordingly (e.g. if the endpoints on the same network, then forward the data directly to the destination).

Since processor 70 can have a full "picture" of local network 24 (and sometimes a full picture of network 20), the dynamic context is typically available at the time of defining forwarding rules 86. Therefore, SDNC 22 can be configured to efficiently store, fetch and process the dynamic context.

If processor 70 detects a change in a given policy 84 or the dynamic context (e.g., the source of a given data flow moves to another site such as remote network 26), the processor can identify any of the local network switches affected by the context or the policy change, invalidate the identified network switches' affected forwarding rules, update rules 86 according to the new policy/context, and convey the updated rules to the identified switches. The updated rules are typically configured at the forwarding devices (e.g. forward the data packets to compression server 40, and then forward the compressed data to the destination).

While the configuration in FIGS. 1 and 2 shows a single SDNC 22 defining and enforcing context-aware network service policies 84, other configurations for defining and enforcing the context-aware network service policies are considered to be within the spirit and scope of the present invention. For example, a first computer (or virtual machine) can monitor the current context of network 24 and a second computer (or virtual machine) can update rules 86 upon receiving a notification from the first computer, and convey the updated rules to the data forwarding devices in network 24.

Processor 70 typically comprises a general-purpose computer, which is programmed in software to carry out the functions described herein. The software may be downloaded to SDNC 22 in electronic form, over a network, for example, or it may be provided on non-transitory tangible media, such as optical, magnetic or electronic memory media. Alternatively, some or all of the functions of processor 70 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Network Policy Management

Figure 3:
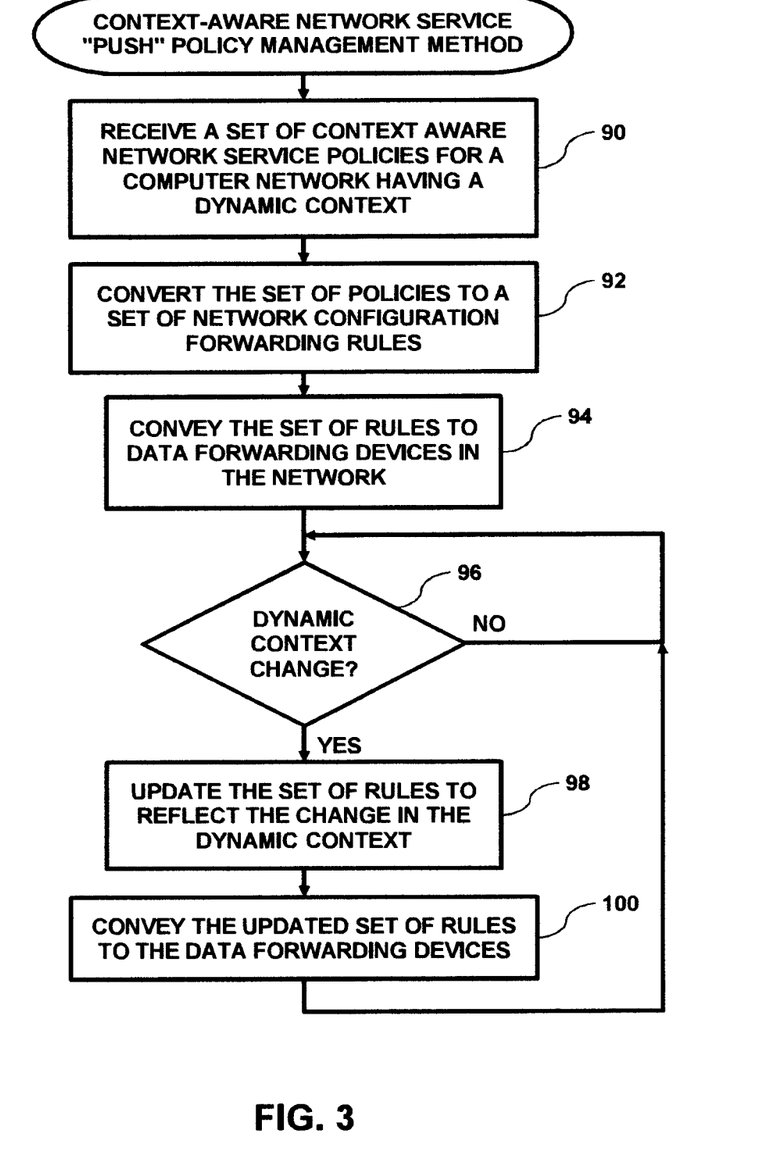
FIG. 3 is a flow diagram that schematically illustrates a method of managing the context-aware network service policies, in accordance with a first embodiment of the present invention.

FIG. 3 is a flow diagram that schematically illustrates a method of defining and enforcing context-aware network service policies 84, in accordance with a first embodiment of the present invention. In the first embodiment of the present invention shown in FIG. 3, processor 70 "pushes" data forwarding rules 86 to the data forwarding devices in network 20.

In a receive step 90, processor 70 receives a set of context-aware network service policies 84, and stores the received polices to memory 72. Processor 70 can receive policies 84 via network 24 or from a system administrator (not shown) via an input device such as a keyboard (not shown).

In a conversion step 92, processor 70 converts context-aware network service policies 84 into corresponding data forwarding rules 86, and in a first convey step 94, the processor conveys the corresponding data forwarding rules to the multiple data forwarding devices in list 76. In network 24 the data forwarding devices comprise switches 36 and 46, gateways 44 and 52, and firewalls 54 and 56. Other examples (not shown) of data forwarding devices that can be configured using embodiments of the present invention include, but are not limited to, bridges, routers, routers, switches, hubs, repeaters, protocol converters, proxy servers and network address translators. In embodiments of the present invention, context detection module can monitors local network 24, and update list 76 with the data forwarding devices currently operating in the local network.

In some embodiments, a given data forwarding rule 86 can specify data handing to be performed by the network. In the configuration shown in FIG. 1, the data handling may comprise encryption server 38 encrypting the data and/or compression server 40 compressing the data. In embodiments of the present invention, the data handling may comprise a rule for transforming the data or a data forwarding rule. Examples of data handling rules include, but are not limited to a data compression rule, a data encryption rule and a data forwarding rule such as a data redirection rule or a data drop rule (e.g., based on packet filtering rules for firewalls 54 and 56).

In some embodiments, multiple data forwarding rules 86 can specify a path between two endpoints in network 24, the path comprising a sequence of multiple network segments 64. In embodiments of the present invention, each of the endpoints may comprise a virtual machine such as a given virtual client 50 or a physical computing device such as a given physical client 48, local NAS server 42, and gateways 44 and 52.

In a comparison step 96, if processor 70 detects a change in the dynamic context of network 24, then the processor updates rules 86 to reflect the change in the dynamic context in an update step 98 (i.e., the processor uses policies 84 and the change in the dynamic context to update rules 86), conveys the updated rules to the data forwarding devices in list 76 in a second convey step 100, and the method continues with step 96.

In one embodiment, the change in the dynamic context comprises a detecting an attribute of data conveyed by network 24. For example, processor 70 may detect untrusted data in network 24 and update rules 86 to require that encryption server 38 encrypts all data conveyed on the local network 24.

In another embodiment, the change in the dynamic context comprises detecting an attribute of network 20. A given attribute of network 20 may comprise an attribute of a given data forwarding device in network 24. For example, if processor detects that firewall 54 is overloaded, then the processor can update rules 86 to require that all outbound data traffic from network 24 is conveyed to internet 28 via firewall 56 and VPN 30. Examples of additional attributes of network 20 include, but are not limited to:

Attributes of physical clients 48 and/or logical clients that are communicating over network 20 (referred to herein as communicating clients).

Attributes of physical clients 48 and/or logical clients that are in proximity to the communicating clients. Examples of these attributes include location and belonging to a specific owner/tenant/application group. For example clients that have the same host or are on the same rack as the communicating clients.

Attributes (e.g., a time of day) that apply to all of network 20.

Figure 4:
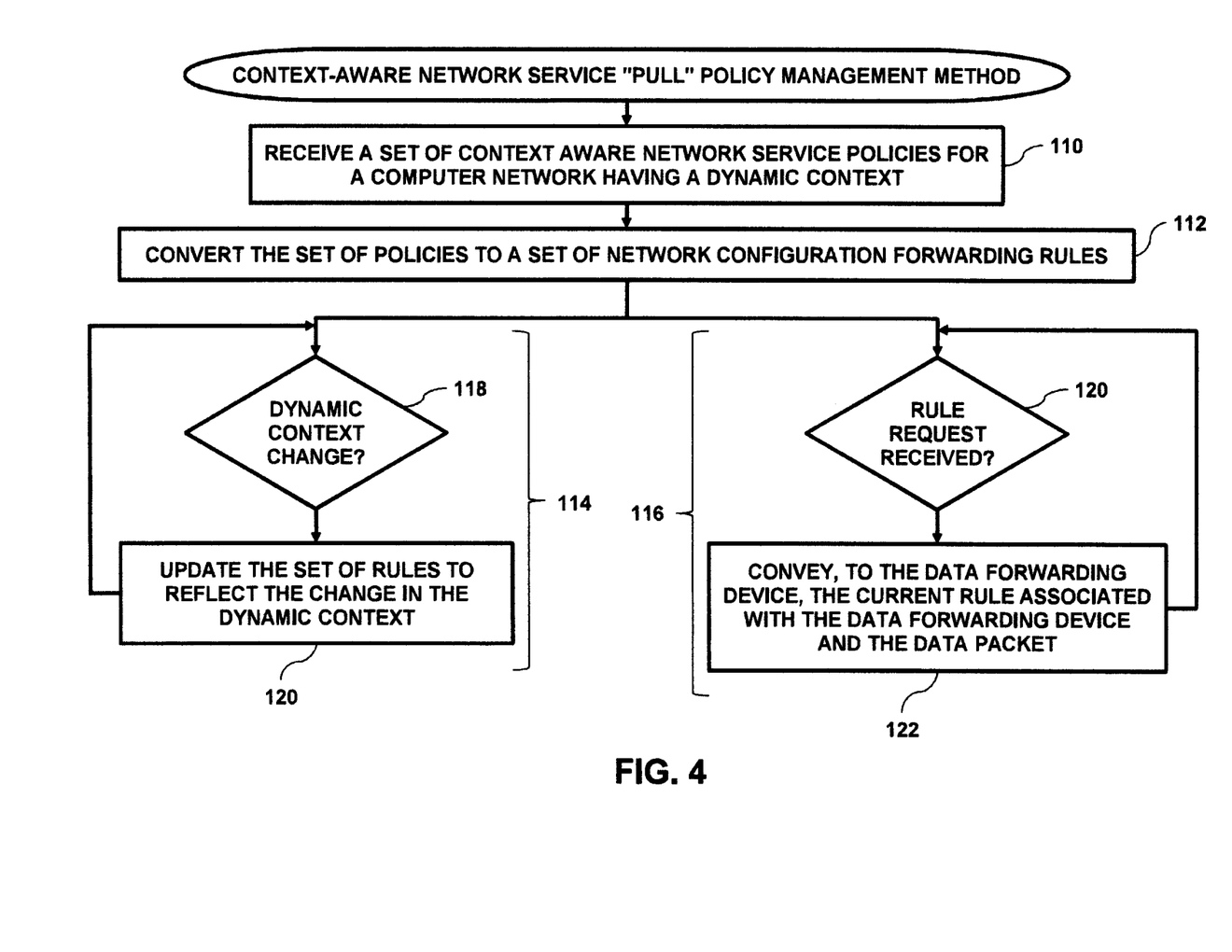
FIG. 4 is a flow diagram that schematically illustrates an additional method of managing the context-aware network service policies, in accordance with a second embodiment of the present invention.

FIG. 4 is a flow diagram that schematically illustrates an additional method of defining and enforcing context-aware network service policies 84, in accordance with a second embodiment of the present invention. In the second embodiment of the present invention shown in FIG. 4, the data forwarding devices in network 20 "pull" rules 86 from SDNC controller 22. As described hereinbelow, upon receiving a data packet, a given data forwarding device request and receive (i.e., "pull") the current data forwarding rule 86 for the given device and the data packet.

In a receive step 110, processor 70 receives a set of context-aware network service policies 84, and stores the received polices to memory 72, and in a conversion step 112, the processor converts context-aware network service policies 84 into corresponding data forwarding rules 86. Upon completing step 112, processor 70 simultaneously executes a first thread 114 that updates rules 86 upon detecting a change in the context of network 20 and a second thread 114 that processes rule requests from data forwarding devices in the network. Thread 114 comprises a first comparison step 116 and an update step 118, and thread 114 comprises a second comparison step 120 and a convey step 122.

In first comparison step 118, thread 114 (specifically context detection module 80) monitors network 20 to detect any change in the network's context. Upon detecting a change in the context of network 20, rule definition module, in update step 118, updates rules 86 to reflect the current context of the network, and thread 114 continues with step 118.

In second comparison step 120, thread 116 waits to receive a rule request from a given data forwarding device in network 20. In embodiments of the present invention the rule request can include information such as an identity of the given data forwarding device, and information about the data packet such as an identity of an origin (e.g., local NAS server 42) of the data packet, and identity of a destination (e.g., remote NAS server 60) for the data packet, and a data-type for the data packet. Upon receiving a rule request from a given data forwarding device, thread 116 identifies a given rule 86 associated with the given forwarding device and the data packet, conveys, in a convey step 12, the identified rule to the given data forwarding device, and thread 116 continues with step 120.

In an alternative "pull" embodiment, processor 70 can convert, on demand, one or more context-aware network service policies to one or more data forwarding rules 86. For example, context detection module 80 can continually monitor the current context of network 20, and upon processor 70 receiving a rule request from a given data forwarding device, rule definition module 82 can identify a given policy 84 for the given forwarding device and the data packet, convert the given policu to a given rule 86, and convey the identified rule to the given data forwarding device.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    configuring a computer with a set of context-aware data forwarding policies of a network having a dynamic context;
    monitoring the dynamic context of the network;
    determining a set of network configuration forwarding rules for one or more data forwarding devices of the network, responsively to the configured context-aware data forwarding policies and the dynamic context of the network;
    operating by the computer, a first thread that detects changes in the dynamic context of the network, responsively to the monitoring and in response to detected changes, updates, based on the set of context-aware data forwarding policies and the detected changes in the dynamic context, the set of network configuration forwarding rules;
    in parallel to operating the first thread, operating a second thread that receives rule requests and in response to the received rule requests conveys to the data forwarding devices, the updated set of network configuration forwarding rules; and
    handling packets by the data forwarding devices according to the conveyed updated set of network configuration forwarding rules.

2. The method according to claim 1, wherein the data forwarding devices are selected from a list consisting of gateways, firewalls, bridges, routers, switches, hubs, repeaters, protocol converters, proxy servers and network address translators.

3. The method according to claim 1, wherein a given network configuration forwarding rule specifies handling data conveyed by the network.

4. The method according to claim 1, wherein conveying a given data forwarding rule comprises receiving, from a given data forwarding device, a rule request for a data packet, identifying a given data forwarding rule for the given data forwarding device and the data packet, and conveying the identified data forwarding rule to the data forwarding device.

5. The method according to claim 1, wherein multiple network configuration forwarding rules define a path between two endpoints on the network.

6. The method according to claim 5, wherein each of the endpoints is selected from a list consisting of a virtual machine and a physical computing device.

7. The method according to claim 1, wherein the dynamic context comprises a network attribute.

8. An apparatus, comprising:
    a network adapter coupled to a network having a dynamic context and comprising one or more data forwarding devices;
    a memory configured to store a set of context-aware data forwarding policies; and
    a processor configured:
        to monitor the dynamic context of the network,
        to determine a set of network configuration forwarding rules for the one or more data forwarding devices, responsively to the configured context-aware data forwarding policies and the dynamic context of the network,
        to operate a first thread that detects changes in the dynamic context of the network, responsively to the monitoring, and in response to detected changes, updates,
        based on the set of context-aware data forwarding policies and the detected changes in the dynamic context, the set of network configuration forwarding rules, and
        in parallel to operating the first thread, operates a second thread that receives rule requests and in response to the received rule conveys to the data forwarding devices, the updated set of network configuration forwarding rules.

9. The apparatus according to claim 8, wherein the data forwarding devices are selected from a list consisting of gateways, firewalls, bridges, routers, switches, hubs, repeaters, protocol converters, proxy servers and network address translators.

10. The apparatus according to claim 8, wherein a given network configuration forwarding rule specifies handling data conveyed by the network.

11. The apparatus according to claim 8, wherein the processor is configured to convey a given data forwarding rule by receiving, from a given data forwarding device, a rule request for a data packet, identifying a given data forwarding rule for the given data forwarding device and the data packet, and conveying the identified data forwarding rule to the data forwarding device.

12. The apparatus according to claim 8, wherein the dynamic context comprises a data attribute.

13. A computer program product, the computer program product comprising:
   a non-transitory computer readable storage medium having computer readable program code embodied therewith, the computer readable program code comprising:
   computer readable program code configured with a set of context-aware data forwarding policies of a network having a dynamic context;
   computer readable program code configured to monitor the dynamic context of the network, and to determine a set of network configuration forwarding rules for one or more data forwarding devices of the network, responsively to the configured context-aware data forwarding policies and the dynamic context of the network;
   computer readable program code configured to operate a first thread that detects changes in the dynamic context of the network, responsively to the monitoring and in response to detected changes, updates, based on the set of context-aware data forwarding policies and the detected changes in the dynamic context, the set of network configuration forwarding rules; and
   computer readable program code configured to operate in parallel to the first thread, a second thread that receives rule requests and in response to the received rule requests conveys, to the data forwarding devices, the updated set of network configuration forwarding rules.

14. The computer program product according to claim 13, wherein a given network configuration forwarding rule specifies handling data conveyed by the network.

15. The computer program product according to claim 13, wherein a given network configuration forwarding rule defines a path between two endpoints on the network, and wherein each of the endpoints is selected from a list consisting of a virtual machine and a computing device.

16. The computer program product according to claim 13, wherein the computer readable program code is configured to convey a given data forwarding rule by receiving, from a given data forwarding device, a rule request for a data packet, identifying a given data forwarding rule for the given data forwarding device and the data packet, and conveying the identified data forwarding rule to the data forwarding device.

17. The computer program product according to claim 13, wherein the dynamic context comprises a network attribute.

18. The method according to claim 1, wherein the set of context-aware data forwarding policies comprises a policy dependent on a measure of available bandwidth in the network and wherein monitoring the dynamic context of the network comprises monitoring the measure of the available bandwidth in the network.

19. The method according to claim 1, wherein the set of context-aware data forwarding policies comprises policies dependent on network endpoint locations and wherein monitoring the dynamic context of the network comprises monitoring the endpoint locations.

20. The method according to claim 1, wherein the set of context-aware data forwarding policies comprises policies dependent on a load on an element in the network and wherein monitoring the dynamic context of the network comprises monitoring the load on the element in the network.

21. The method according to claim 1, wherein conveying, to the data forwarding devices, the updated set of network configuration forwarding rules comprises identifying a subset of the data forwarding devices affected by the change and conveying updated rules only to the identified subset.

22. The method according to claim 1, wherein determining a set of network configuration forwarding rules comprises determining whether to compress data transmitted through the network responsive to the dynamic context.

23. The method according to claim 1, wherein monitoring the dynamic context comprises monitoring a location, connection status or utilization level of one or more elements of the network.

\* \* \* \* \*